Sept. 12, 1939.    C. SCHLUMBERGER    2,172,625
PROCESS FOR INVESTIGATING PERMEABLE STRATA TRAVERSED BY A BORING
Filed June 28, 1935
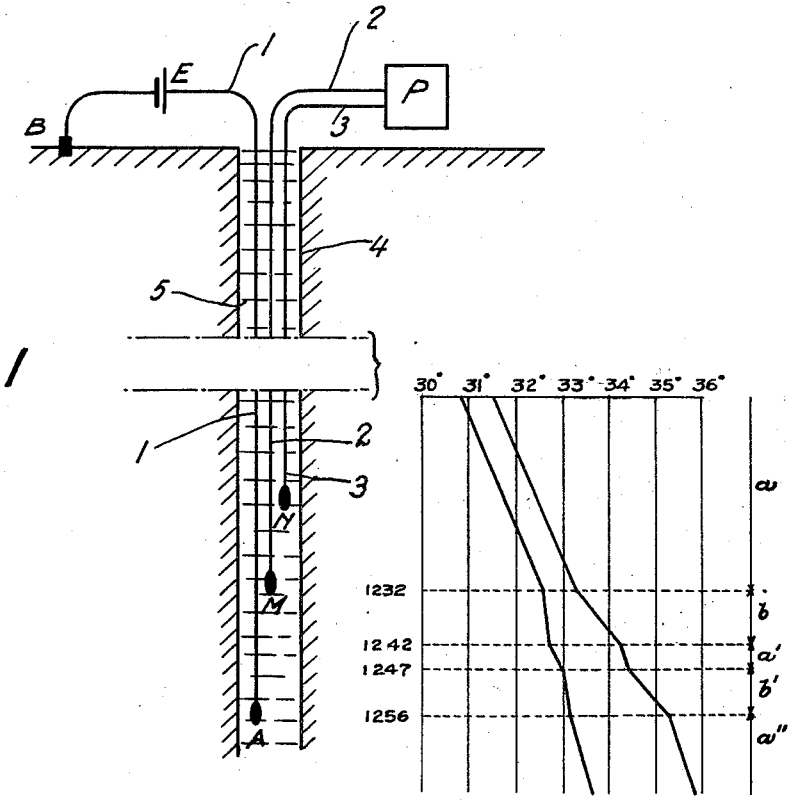
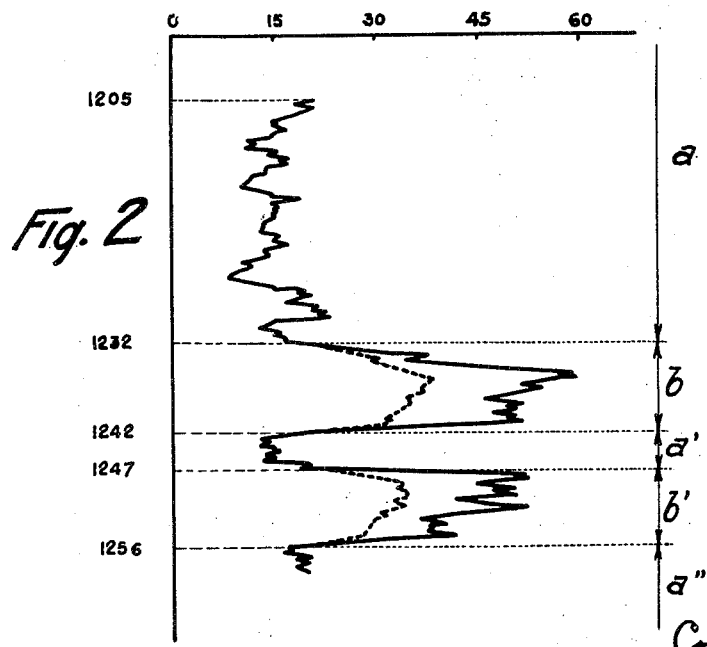
Inventor:
Conrad Schlumberger
By Mauro + Lewis
Attorneys

UNITED STATES PATENT OFFICE 2,172,625

PROCESS FOR INVESTIGATING PERMEABLE STRATA TRAVERSED BY A BORING

Conrad Schlumberger, Paris, France; Anne Marguerite Louise Doll administratrix of said Conrad Schlumberger, deceased, assignor to Societe de Prospection Electrique Procedes Schlumberger, Paris, France, a corporation of France Application June 28, 1935, Serial No. 28,947
In France February 4, 1935

9 Claims. (Cl. 175—182)

The investigation and detailed survey of porous or permeable strata traversed by a drill hole is particularly important in drillings effected for water, petroleum or natural gas. This investigation is made, in general, by taking cores which are cut out mechanically from the bottom of the hole and later examined at the surface or, again, by measurements of spontaneous electrical potential made inside the drill hole previously filled with water, according to the method described in the U. S. Patent No. 1,913,293, filed on January 23, 1932 (corresponding to French Patent No. 723,592 of September 2, 1931).

The present invention has for its object to provide a process for the determination of porous strata traversed by a drill hole and consisting essentially in effecting, at different depths inside the uncased part of the bore hole, two series of measurements of a predetermined physical parameter (that is, an independent variable through the functions whereof other variables may be determined) of the ground situated in the immediate neighbourhood of the hole (such as the electric resistivity, the specific inductive capacity, the density, the thermal conductivity, etc.) by causing to vary, from one series of measurements to the other, the value of said parameter by changing the nature of the liquid which impregnates the porous strata. Comparison of the two series of measurements then enables one to determine the depths in the drill hole where the change of liquid has modified the value of the parameter measured, said depths corresponding to porous strata, whilst for impervious strata no modification is produced. Moreover, by effecting, at the depth of a predetermined porous stratum, a series of successive measurements of the physical parameter in question during the time of the penetration of the second liquid into said stratum, it is possible to evaluate, by a comparison of the successive values obtained, the speed at which the liquid penetrates into the said stratum and consequently to estimate the permeability thereof.

The invention envisages more particularly utilizing as the variable parameter the electric resistivity of the rocks which form the walls of the bore hole. It is, in fact, known that the specific resistivity of a rock is a function of the quantity and of the nature of the water absorbed thereby. For a given rock, having a given volume of interstices or pores, this resistivity is proportional to the resistivity of the impregnating liquid. In particular, the injection of conductive brine into a permeable rock, previously filled with fresh water, reduces the resistivity of the said rock in the ratio of the resistivities of the fresh water and of the brine. If, therefore a series of successive measurements is made on a given volume of said rock in order to obtain its mean resistivity, it is possible to follow the progressive penetration thereof by the brine.

The attached drawing represents, by way of non-limiting examples:

Fig. 1, a device for effecting the measurements of the resistivity in the drill hole;

Fig. 2, two diagrams of resistivity actually obtained by the process according to the invention;

Fig. 3, two diagrams of thermal conductivity obtained by the process of this invention.

The technique adopted for effecting the measurements of resistivity may be, for example, that described in the U. S. Patent No. 1,819,923, dated August 18, 1931 (corresponding to French Patent No. 678,113 of October 26, 1928). It consists in lowering into the liquid contained in the uncased portion of the drill hole 4 (Fig. 1) three electrodes A, M and N, suspended at the end of three insulated leads 1, 2, 3, at fixed distances the one from the other. The electrode A is used to send through the soil a current of known intensity and is therefore connected to a source of current E (direct or alternating) whose other terminal is grounded in B at the surface. The two electrodes M and N are connected by means of their leads to a potentiometer P, at the surface, which measures the difference of potential produced by the flowing of the current. The resistivity of the soil is then deduced from these data.

For the present process, nothing particular is to be noted as regards these measurements, except, however, that they should involve only the portion of earth situated in the immediate neighbourhood of the hole. This necessitates that the respective distances between the three electrodes A, M and N be not too great as compared with the diameter of the hole. The reason for this limitation is obvious: the penetration of liquid into a permeable formation resulting from an increase of pressure inside said hole takes place only in the portions of formation immediately surrounding the hole; the electrical measurements should therefore only involve those portions of the earth.

The following method of operation may be employed:

The hole being filled with water (or mud which is the equivalent) for a certain length of time, as is always the case in rotary drillings, measurements are made of the resistivity of the various formations or strata in the uncased part of the drill hole. These measurements are generally translated into a continuous diagram or graph of resistivity as a function of the depth. The water in the hole is then replaced by another liquid of quite different resistivity, for example, by brine, which is highly conductive, or by oil which is insulating. This liquid is maintained at a suitable pressure and for sufficient time to permit it to filter, as a result of its overpressure, into the interior of the porous strata, driving in front of it the fluid which previously filled the said strata (water, oil gas). When this procedure is sufficiently advanced a second series of measurements of resistviity is made throughout the length of the drill hole, that is to say a second diagram of resistivity is made.

For all the strata which are impervious no modification will have taken place: the resistivity will have maintained the same value. For all permeable strata on the contrary, the value of the resistivity will have varied as a result of the penetration, into the pores of the rock, of the second liquid which has driven out the original liquid contained therein, up to a certain distance from the drill hole. Comparison of the two diagrams obtained thus shows the respective depths of the impervious strata, whose resistivity has remained constant, and of the permeable strata, whose resistivity has varied between the two operations.

The Figure 2 of the attached drawing represents by way of non-limiting example two diagrams of resistivity actually obtained by this process in an oil field.

In these diagrams, the depths in feet are given as ordinates and the value of the resistivity of the rock in the neighbourhood of the hole at different depths, is given as abscissae in ohms per cubic metre.

The measurements were first effected, by filling the hole with mud formed with fresh water and consequently resistive (resistivity 9 ohms per cubic metre). The diagram representing these measurements is shown in full lines. Then the original mud was replaced by a conductive brine (resistivity 0.5 ohm per cubic metre) and after sufficient time to allow for the penetration of this brine into the porous strata the resistivity of the rocks in the neighbourhood of the hole was again measured. The results obtained in this second operation where they differ from those of the first diagram are indicated in dotted lines.

The conclusions to be arrived at from these diagrams are as follows: At the parts $a$, $a'$, $a''$ of the drill hole between 1205 and 1232 feet, then 1242 and 1247 feet and also below 1256 feet, the change in the nature of the mud has not involved any variation in the resistivity of the rock, which shows that the strata in question are impervious. On the contrary at the parts $b$, $b'$ at 1232 to 1242 feet and at 1247 to 1256 feet, the resistivity of the wall has been substantially reduced, which indicates a penetration of the conductive mud into the earth and consequently leads to the conclusion that a permeable formation, for example a stratum of sand, is present.

It is also possible to proceed in a different manner. Instead of injecting a second liquid into the porous strata already previously penetrated to a slight depth by the water of the drill hole which is at a sufficient pressure to bring about the said penetration, it is possible to reduce this pressure and allow the natural fluid included in the said strata (oil gas, water) to flow into the drill hole under the action of its own pressure. This again produces a modification of the resistivity of the porous strata in the part thereof immediately surrounding the hole, as a result of a change in the nature of the liquid which fills the pores in the said region, whilst the impervious strata are always indicated by the fact that their resistivity remains constant.

Whatever be the method of operation adopted the investigations may be carried out in a more complete manner, particularly when it is desired to study one given permeable stratum. For this purpose several successive measurements of the resistivity of the said stratum should be made during the penetration of the second liquid. It is in this way possible to evaluate the speed of said penetration by observing the modification which the resistivity undergoes as a function of time, when the filtration of the second liquid into the stratum is maintained by the application of pressure. It is then possible even to calculate the coefficient of permeability of the stratum in question by taking into consideration the value of various factors such as the resistivity of the original impregnating water contained in the stratum and of the second liquid and the spacing of the three electrodes.

Finally, as has been indicated above, it is possible to apply to the determination of porous strata either of the above described processes, or indeed any process which enables measurement to be made at different depths inside the drill hole of a physical parameter of the surrounding ground other than the electric resistivity. For example, it is possible to utilize the specific thermal conductivity in the same way as the electric conductivity by establishing two successive diagrams of the thermal conductivity of the rock along the drill hole, the first when the hole is filled with a thermally insulating liquid and the second when this liquid has been replaced by a conductive one which has been forced by pressure into the porous strata. Fig. 3 of the attached drawing represents two such diagrams obtained in the same drill hole as the diagrams shown in Fig. 2. The measurements effected are simple thermometrical measurements giving the temperature $t$ in each point of the drill hole as a function of the depth (in feet). The "slope" of the two diagrams, which characterizes the geothermic degree, varies, as is known, with the thermal conductivity of the rocks. Opposite the impervious rocks, whose thermal conductibility has not been modified by the change in the nature of the liquid, the "slope" of the two diagrams is the same; whereas, opposite the permeable strata, whose thermal conductivity has been modified by the penetration of the second liquid, the "slope" of one diagram differs from that of the other. It may thus be seen that the thermal conductivity of the rocks has varied at the parts $b$, $b'$ of the drill hole, between 1232 and 1242 feet, and between 1247 and 1256 feet. The strata comprised between these levels are therefore permeable strata.

The thermic measurements may be made by methods and apparatus now well known, such, for example, as described in U. S. Patent No. 2,050,128, granted August 4, 1936, for Thermometric method of locating the top of the cement behind a well casing, the same being an invention of this applicant.

By the expression, "changing the nature of the liquid", used in certain of the appended claims, is meant effecting a change in the composition or in the properties of the liquid such as will create a measurable difference—either electrical, thermic, or other—in the character thereof. The desired change may, of course, be effected by changing the liquid itself, that is, by substituting for the liquid first used a different liquid. But it may be effected also, as already explained, by introducing into the body of the liquid first used an ingredient which measurably alters its electrical, thermic, or other properties.

What I claim is:

1. A process for the investigation of the permeability of the strata traversed by a drill hole and which consists in effecting, at different depths in the drill hole, a first series of measurements of a predetermined physical parameter of the rocks forming the wall of the hole, said parameter being a function of the liquid impregnating these rocks, then changing the nature of the liquid contained in the pores of the permeable rocks and effecting a second series of measurement of said parameter and finally determining, by comparison of the two series of measurements, the places along the drill hole where penetration of the said liquid into the permeable strata has modified the value of the physical parameter, the impervious strata being characterized by the constant value of the said parameter.

2. A process for the investigation of the permeability of the strata traversed by a drill hole and which consists in effecting, at different depths in the drill hole, a first series of measurements of a predetermined physical parameter of the rocks forming the wall of the hole, said parameter being a function of the liquid impregnating these rocks, then changing the nature of the liquid contained in the pores of the permeable rocks by forcing, by pressure in the hole, a second and different liquid in these pores, then effecting a second series of measurements of said parameter and finally determining, by comparison of the two series of measurements, the places along the drill hole where penetration of the said liquid into the permeable strata has modified the value of the physical parameter, the impervious strata being characterized by the constant value of the said parameter.

3. A process for the investigation of the permeability of the strata traversed by a drill hole and which consists in effecting, at different depths in the drill hole previously filled with a liquid, a first series of measurements of a predetermined physical parameter of the rocks forming the wall of the hole, said parameter being a function of the liquid impregnating these rocks, the liquid of the hole being maintained before and during these first measurements at a suitable pressure sufficient to ensure penetration thereof into the pores of the permeable strata, then decreasing said pressure so as to permit the natural fluid filling said permeable strata to drive out the liquid which had previously filtered in from the hole, effecting a second series of measurements of the said physical parameter and finally determining, by comparison of the two series of measurements, the places along the drill hole where the replacement of the filtered liquid by the natural fluid contained in the permeable strata has modified the value of said parameter, the impervious strata being characterized by the consant value of the said parameter.

4. A process for the investigation of the parmeability of the strata traversed by a drill hole and which consists in effecting, at different depths inside the uncased part of the drill hole previously filed with a liquid, a first series of measurements of the specific electrical resistivity of the rock forming the wall of the hole, the liquid of the hole being maintained before and during these first measurements at a suitable pressure sufficient to ensure penetration thereof into the pores of the permeable strata, then decreasing said pressure so as to permit the natural fluid filling said permeable strata to drive out the liquid which had previously filtered in from the hole, effecting a second series of measurements of the resistivity, and finally determining, by comparison of the two series of measurements, the places along the drill hole where the replacement of the filtered liquid by the natural fluid contained in the permeable strata has modified their resistivity, the impervious strata being characterized by their constant resistivity.

5. A process for the investigation of the permeability of the strata traversed by a drill hole and which consists in effecting, at different depths inside the uncased part of the drill hole previously filled with a liquid, a first series of measurements of the specific electrical resistivity of the rocks forming the wall of the hole, then changing the nature of the liquid contained in the pores of the permeable rocks by forcing, by pressure in the hole, a second and different liquid in these pores, then effecting a second series of resistivity measurements and finally determining, by comparison of the two series of measurements, the places along the drill hole where penetration of the second liquid into the permeable strata has modified their resistivity, the impervious strata being characterized by their constant resistivity.

6. A process for the investigation of the permeability of the strata traversed by a drill hole and which consists in effecting, at different depths inside the uncased part of the drill hole previously filled with water, a first series of specific electrical resistivity measurements of the rocks forming the wall of the hole, replacing the water of the hole by another liquid whose resistivity differs from that of said water, maintaining said liquid at a suitable pressure during a time sufficient for it to penetrate into the permeable strata to a certain distance from the hole, then effecting a second series of measurements of the resistivity of the rocks, and finally determining by the comparison of the two series of measurements the places along the drill hole where the penetration of the second liquid into the permeable strata has modified their resistivity, the impervious strata being characterized by their constant resistivity.

7. A process for investigating the permeability of a predetermined porous stratum in the still uncased part of a drill hole previously filled with water and which consists in replacing the water of the drill hole by a liquid having an electric resistivity different from that of said water, maintaining the said liquid at a suitable pressure during a time sufficient for it to penetrate into the porous stratum to a certain distance from the hole, effecting at the depth of said stratum a series of successive measurements of the electrical resistivity during the time of penetration of the second liquid into the said stratum and evaluating by comparison of the successive values of the resistivity the speed at which the liquid penetrates the said stratum.

8. A process for the investigation of the permeability of the strata traversed by a drill hole and which consists in effecting, at different depths in the drill hole previously filled with a liquid, a first series of measurements of the thermal conductibility of the rocks forming the wall of the hole, then changing the nature of the liquid contained in the pores of the permeable rocks by forcing, by means of pressure in the hole, a second liquid of different thermal conductivity in said pores, then effecting a second series of thermal conductivity measurements, and finally determining, by comparison of the two series of measurements, the points along the drill hole where penetration of the second liquid into the permeable strata has modified their thermal conductivity, the impervious strata being characterized by their constant thermal conductivity.

9. A process for the investigation of the permeability of the strata traversed by a drill hole and which consists in effecting, at different depths in the drill hole previously filled with a liquid, a first series of measurements of the thermal conductivity of the rocks forming the wall of the hole, the liquid of the hole being maintained before and during said first measurements at a suitable pressure sufficient to ensure penetration thereof into the pores of the permeable strata, then decreasing said pressure sufficiently to permit the natural fluid filling said permeable strata to drive out the liquid which had previously filtered in from the hole, effecting a second series of measurements of the thermal conductivity and finally determining, by comparison of the two series of measurements, the places along the drill hole where the replacements of the filtered liquid by the natural fluid contained in the permeable strata has modified their thermal conductivity, the impervious strata being characterized by their constant thermal conductivity.

CONRAD SCHLUMBERGER.